(12) United States Patent
Robyr et al.

(10) Patent No.: US 8,677,147 B2
(45) Date of Patent: Mar. 18, 2014

(54) METHOD FOR ACCESSING SERVICES BY A USER UNIT

(75) Inventors: Sebastien Robyr, Epalinges (CH); Guy Moreillon, Bioley-Orjulaz (CH)

(73) Assignee: Nagravision S.A., Cheseaux-sur-Lausanne (CH)

( * ) Notice: Subject to any disclaimer, the term of this patent is extended or adjusted under 35 U.S.C. 154(b) by 253 days.

(21) Appl. No.: 12/926,094

(22) Filed: Oct. 26, 2010

(65) Prior Publication Data

US 2011/0099364 A1 Apr. 28, 2011

(30) Foreign Application Priority Data

Oct. 27, 2009 (EP) .................................... 09174224

(51) Int. Cl.
*H04L 29/06* (2006.01)

(52) U.S. Cl.
USPC .............. 713/189; 713/150; 726/26; 380/201

(58) Field of Classification Search
USPC .......................................... 713/189; 380/201
See application file for complete search history.

(56) References Cited

U.S. PATENT DOCUMENTS

| | | | |
|---|---|---|---|
| 5,301,233 A | 4/1994 | Coutrot et al. | |
| 7,305,555 B2 * | 12/2007 | Okimoto et al. | 713/168 |
| 7,478,069 B1 * | 1/2009 | Ritter et al. | 705/52 |
| 8,311,516 B2 * | 11/2012 | Kim et al. | 455/411 |
| 2002/0046406 A1 * | 4/2002 | Chelehmal et al. | 725/87 |
| 2002/0077988 A1 * | 6/2002 | Sasaki et al. | 705/59 |
| 2003/0005435 A1 * | 1/2003 | Nelger et al. | 725/31 |
| 2003/0138101 A1 | 7/2003 | Stransky | |
| 2003/0182579 A1 | 9/2003 | Leporini et al. | |
| 2003/0188154 A1 | 10/2003 | Dallard et al. | |
| 2004/0017918 A1 | 1/2004 | Nicolas | |
| 2005/0177741 A1 | 8/2005 | Chen et al. | |
| 2005/0276284 A1 | 12/2005 | Krause et al. | |
| 2006/0059342 A1 * | 3/2006 | Medvinsky et al. | 713/168 |
| 2008/0065548 A1 | 3/2008 | Muijen | |
| 2009/0010434 A1 | 1/2009 | Carles | |
| 2009/0138966 A1 | 5/2009 | Krause et al. | |

FOREIGN PATENT DOCUMENTS

| | | |
|---|---|---|
| EP | 0 528 730 A1 | 2/1993 |
| EP | 1 182 874 A1 | 2/2002 |
| EP | 1 562 318 A1 | 8/2005 |
| FR | 2 895 865 A1 | 7/2007 |

(Continued)

OTHER PUBLICATIONS

"A low complexity TV remote controller with user individual behavior embedded", Lai et al., IEEE, Jan. 10-14, 2007.*

(Continued)

*Primary Examiner* — Mohammad L Rahman
(74) *Attorney, Agent, or Firm* — Harness, Dickey & Pierce, P.L.C.

(57) ABSTRACT

The invention concerns a method for providing a plurality of receivers with conditional access to broadcast services using a simplified means for managing the control messages required by such conditional access schemes. The method involves providing all information which will allow a registered receiver having the necessary decryption key to access the services without having any prior rights loaded locally. A management center keeps a register of all subscribed receivers, including a list of services to which the receiver is subscribed, and encrypts the services using control words encrypted by the necessary keys. Control messages comprising the control words for decryption are provided within a special channel to which the receiver has permanent access, the special channel being a different one from channels used for broadcasting audio/video services.

13 Claims, 2 Drawing Sheets

(56) References Cited

FOREIGN PATENT DOCUMENTS

| FR | 2 897 736 A1 | 8/2007 |
|---|---|---|
| WO | WO-01/80563 A1 | 10/2001 |
| WO | WO-02/15578 A1 | 2/2002 |
| WO | WO-2004/010698 A1 | 1/2004 |
| WO | WO-2006/027749 A1 | 3/2006 |

OTHER PUBLICATIONS

Onishi, H., Uehara, T., Satoh, T., & Yamaoka, K. (2005). IP Multicasting Video Broadcasting System With User Authentication. IEEE.*

Sanjeev Verma et al: "BCRO and Various Addressing Modes, OMA-BCAST-2005-0221R02-BCRO-AND-Various-Addressing-Modes. doc" Internet Citation, [Online] XP002439102 Retrieved from the Internet: URL:http://member.openmobilealliance.org/ftp/Public_documents/BCAST/2005/> [retrieved on Jun. 22, 2007] * paragraph [5.4.2.3] *.

Digital Video Broadcasting: "IP Datacast over DVB-H: Service Purchase and Protection (SPP)" Internet Citation, [Online] XP002406708 Retrieved from the Internet: URL:http://www.dvb-h.org/PDF/a100.tm3455r3.cbmsl476.IPDC_SPP.pdf> [retrieved on Nov. 9, 2006] * pp. 109-111 *.

"Functional Model of a Conditional Access System" EBU Review-Technical, European Broadcasting Union. Brussels, BE, No. 266, Dec. 21, 1995, pp. 64-77, XP000559450, ISSN: 0251-0936, * the whole document *.

* cited by examiner

| STB | K | UA | Sub |
|---|---|---|---|
| STB1 | K1 | UA1 | P1 |
| STB2 | K2 | UA2 | P1 |
| STB3 | K3 | UA3 | P5 |
| STB4 | K4 | UA4 | P1, P2, P3 |
| STB5 | K5 | UA5 | P1, P2, P4 |

MC

| EMM | UA1 | $(K1)_{Ku1}$ | | | | |
|---|---|---|---|---|---|---|
| ECM1 | UA1 | ID(P1) | $(cw1; cw2; cw3)_{K1}$ | | | |
| ECM2 | UA2 | ID(P1) | $(cw1; cw2; cw3)_{K2}$ | | | |
| ECM3 | UA3 | ID(P5) | $(cw7; cw8)_{K3}$ | | | |
| ECM4 | UA4 | ID(P1) | $(cw1; cw2; cw3)_{K4}$ | ID(P2) | $(cw4)_{K4}$ | ID(P3) | $(cw5)_{K4}$ |
| ECM5 | UA5 | ID(P1) | $(cw1; cw2; cw3)_{K5}$ | ID(P2) | $(cw4)_{K5}$ | ID(P4) | $(cw5)_{K5}$ |

FIG. 3

FIG. 4a  ECM4a | UA4 | ID(P1) | (cw1)$_{K4}$ | ID(P2) | (cw4)$_{K4}$ | ID(P3) | (cw5)$_{K4}$

FIG. 4b  ECM4b | UA4 | (cw1;cw4;cw5;0;0)$_{K4}$

FIG. 4c  ECM4c | UA4 | (1;1;1;0;0) | (cw1)$_{Kn}$; (cw4)$_{Kn}$; (cw5)$_{Kn}$; (Kn)$_{K4}$

FIG. 4d  ECM4d | UA4 | ID(P1) | ID(P2) | ID(P3) | (cw1, cw4, cw5)$_{K4}$

METHOD FOR ACCESSING SERVICES BY A USER UNIT

CROSS REFERENCE TO RELATED APPLICATION

This application claims priority under U.S.C. §119 to European Patent Application No. EP 09174224.7, filed on Oct. 27, 2009, in the European Patent Office, the entire contents of which are incorporated by reference.

TECHNICAL FIELD

The present invention concerns a method for accessing services by a user unit, in particular services containing conditional access data related to the field of pay-TV. More specifically, the method of the invention is intended to provide access to broadcast encrypted data to registered subscribers.

BACKGROUND ART

As it is well known in the field of digital pay television, a digital data stream, for example an audio/video stream is broadcast towards user units in encrypted form in order to be able to control the use of this data and to define the conditions for this use. This encryption is achieved thanks to Control Words that are changed at a regular interval (typically between 5 and 30 seconds, although notably longer intervals may be used) in order to dissuade any attack aiming to discover this control word.

In order for the receiving user unit to be able to decrypt the encrypted data stream with these control words, the latter are sent independently of the stream in entitlement control messages (ECM). In the existing systems, these entitlement management messages are broadcast in encrypted form, the encryption key pertaining to the transmission system between a management centre and the user unit. In fact, the security operations are carried out in a security module (SC) of the user unit.

As it is well known from the man skilled in the art, the security module can essentially be realized according to four distinct forms. One of these forms is a microprocessor card, a smart card, or more generally an electronic module (taking the form of key, a badge, . . . ). Such a module is generally removable and connectable to the decoder. The form with electric contacts is the most widely used, but a connection without contact for example of the type ISO 14443 is not excluded.

A second known form is that of an integrated circuit box, generally placed definitively and irremovably in the decoder. An alternative is made up of a circuit mounted on a base or connector such as a SIM module connector.

In a third form, the security module is integrated into an integrated circuit box also having another function, for example in a descrambling module of the decoder or in the microprocessor of the decoder.

In a fourth embodiment, the security module is not realized as hardware, but its function is implemented only in software form. Given that in the four cases, the function is identical although the security level differs, we can talk about a security module regardless of the way in which its function is carried out or the form that this module may take.

A control message (ECM) does not only contain the control word but also the conditions required for this control word to be sent back to the receiver/decoder.

At the time of the decryption of a control message (ECM), it is verified, in the security module (SC), if the right to access the stream is present. This right can be sent by entitlement management messages (EMM) that load this right into the security module.

The control word is only returned to the user unit when the comparison is positive. This control word is contained in a control message ECM that is encrypted by a transmission key.

In order for the right to be present in the security module, it is generally loaded into this module by an authorization message (EMM) which for security reasons, is generally encrypted by a different key, called right key (RK).

According to a known form of Pay-TV diffusion, the three following elements are necessary to decrypt an event at a given time:
- the data related to the event encrypted by one or a plurality of control-words (CW),
- the control message(s) ECM containing the control-words (CW) and the access conditions (AC)
- the corresponding right stored in the security module allowing the verification of said access conditions.

Accounting for the use of audio video content or other conditional access data is today based on the principle of subscription, on the purchase of events or on payment by time unit.

Subscription allows the definition of a right associated to one or more channels or services transmitting the content and allows the user to obtain these services in clear if the right is present in his/her user unit.

Although these systems work very well and are widely implemented, the management of a large variety of different access conditions can be quite complex. In the known systems using encrypted data stream, entitlement control messages ECM and entitlement management messages EMM, a conditional access kernel is required. This conditional access kernel implies a complex system and a great reliability in order to ensure a great security level.

One object of the invention is to simplify the system while ensuring at least the same level of security as in prior art systems.

Another drawback with prior art inventions is that the management center must be certain that almost all of the authorized user units received the entitlement management messages. Therefore, the messages must be sent several times, which requires a great bandwidth.

An object of the present invention is to enable the authorized users to access to conditional access data while using a smaller bandwidth.

In the prior art inventions, when a user unit receives a control word, it needs time to decrypt it and to access to the encrypted data. When a user watches one channel, this is usually not a drawback as generally, two control words are sent simultaneously; one for the current cryptoperiod and one for the next cryptoperiod. The next control word can thus be decrypted while the current one is used.

However, when a user changes the channel, prior art systems may require quite a long time before the content may be decrypted and displayed.

An object of the invention is to lower the waiting time when the user changes the channel he/she is watching.

An attempt to achieve the objects of the invention is described in EP0 528 730. In the invention described in this document, a content to be sent to several users is split into several blocks. A root control word is used together with a key pertaining to each concerned user unit to form a personal control word. This personal control word is used to encrypt the blocks of content. Thus, each block is specific to the user for which it is intended and it cannot be used by another user.

This method could be of interest in case the data to be sent is of small size. If this is not the case, as for example in the content is a pay TV audio/video files, this method would not be applicable or with difficulties as it would involve sending to each user a great amount of data.

In other prior art documents, such as for example in FR 2 895 865, the solution to prevent a fraudulent user to have access to a conditional access content is to authenticate each user prior to sending him/her content. Once authenticated, the audio/video data as well as the ECM containing the control word are identical for each user.

BRIEF DESCRIPTION OF THE INVENTION

The object of the invention is achieved by a method for accessing services by a user unit, said services being a subset of all services broadcast by a management center and comprising at least two services, said subset of services defining a package, each service being simultaneously broadcast and containing audio/video data, the data of a service being encrypted by at least one control word, the method comprising the steps of:
- determining in a management center, the package a user unit is entitled to access to;
- determining in said management center a unique key pertaining to said user unit;
- forming a message containing at least one control word for each service of the package for which the user's unit is entitled, said control word being secured by the key pertaining to said user unit so that said key must be used to obtain the control word;
- transmitting to at least said user unit said message on at least one channel accessible whatever the selected service is.

BRIEF DESCRIPTION OF DRAWINGS

The present invention and its advantages will be better understood with reference to the enclosed drawings and to the detailed description of a particular embodiment, wherein:
FIG. 1 shows different possibilities of packages;
FIG. 2 shows a table in a management center;
FIG. 3 represents messages that are sent to subscribers;
FIGS. 4a, 4b, 4c and 4d illustrate different possible formats of messages of FIG. 3.

MODES FOR CARRYING OUT THE INVENTION

Figure 5:
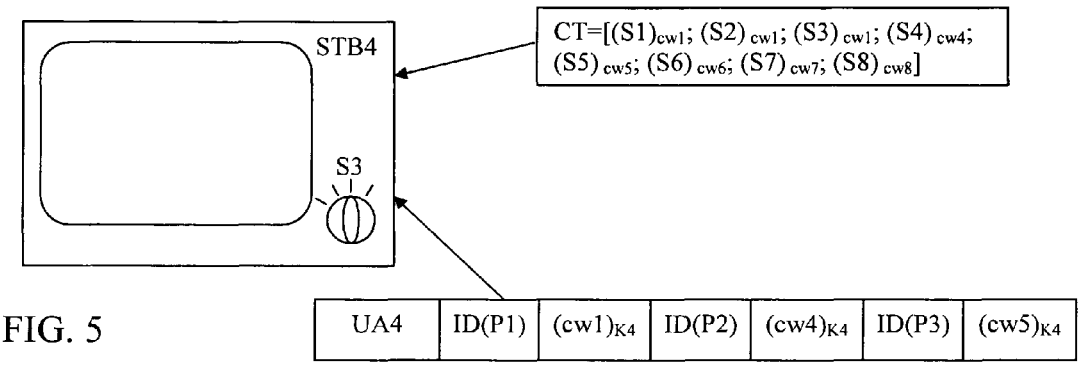
FIG. 5 schematically illustrates the data received by a user unit.
Figure 6:
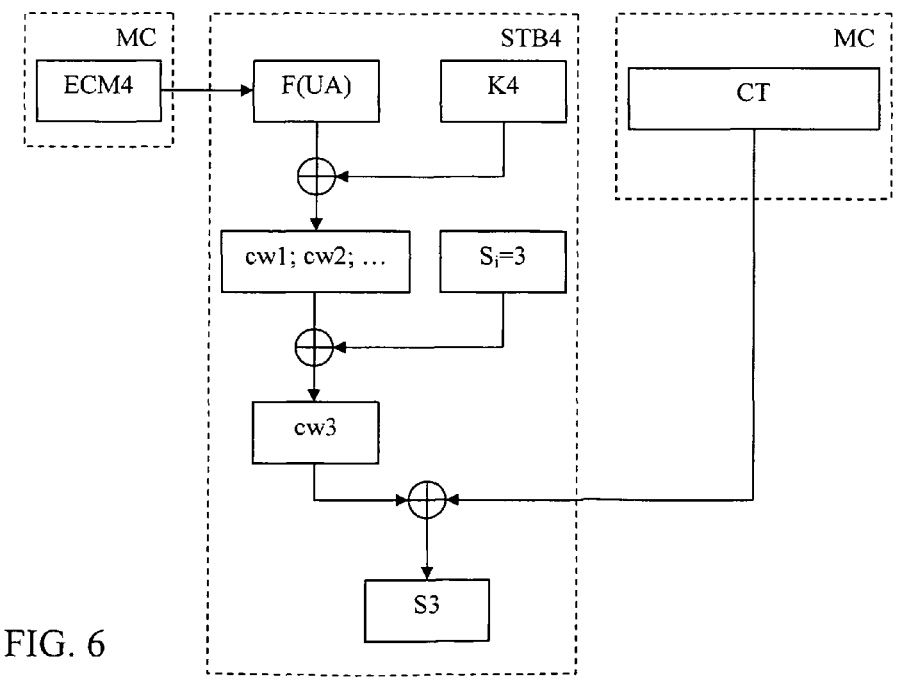
FIG. 6 is a bloc diagram illustrating the method of the present invention.

According to the present invention, data is broadcast to the users in encrypted form as in prior art conditional access systems. Messages containing the control words may be broadcast to the users or may be sent individually by a point-to-point connection for example. In any case, contrary to the existing systems, the ability for a user unit to use a control message depends on the content of this messages only and not on another "right" messages.

According to the present invention, access to conditional access data is made through subscription. A subscription, in the context of this invention means that the user unit must be registered in a management center prior to having access to data. In this context, a subscription may be valid for example only for one event or for a given time period.

In such a system, data is broadcast on several services, noted S1 to S8 in the example illustrated by the drawings. A service means herein a channel on which at least audio/video content can be received. One or several services can define a package. A user unit is entitled to access to at least two services forming a subset of all the services broadcast by a management center. These at least two services can be two services of a same packet or one packet of different services for example. By way of example, service S1, S2 and S3 can form a package P1. Service S4 can define a package P2, S5 corresponds to package P3, S6 corresponds to package P4 and services S7 and S8 define package P5. This is schematically shown on FIG. 1. A package is defined in such a way that a single service does not belong to two different packages.

Package P1, corresponding to services S1, S2 and S3 could for example correspond to a basic offer and the other packages P2, P3, P4 and P5 could correspond to specific channels, for example thematic channels.

When a new user having a user unit STB subscribes to specific packages, for example P1, this user unit must be registered in a management center MC shown on FIG. 2. This management center contains a table with a record for each user unit. A record in this table may optionally contain a user unit identifier STB1 such as a name or a number. The table contains a unique identification number or unique address UA, as well as a key pertaining to the concerned user unit and the list of packages for which the user has subscribed, P1 in this example.

According to the method of the invention, the conditional access data corresponding to the service S1 is broadcast in encrypted form, the encryption being done with a control word cw1. As mentioned previously, one control word is usually used to encrypt a portion of an event, corresponding for example to a time of a few seconds to a few minutes of audio/video content. Each part of the content is usually encrypted with another control word. For purpose of simplification, the same notation cw1 is used for all the control words corresponding to one service.

According to a first embodiment, the services of a single package can share the same control word. Thus, as services S1, S2 and S3 belong to the same package P1, a single control word may be used to encrypt/decrypt data corresponding to services S1, S2 or S3. Usually, the control words are generated individually for each package so that the control words for package P1 are different from the control words for package P2. However, according to particular embodiments explained below, control words of different packages can be linked.

According to a second embodiment, each service S1 to S8 is encrypted with its own control word cw1 to cw8 respectively. A combination of all these embodiments is also possible. For example services S1, S2 and S3 could share the same control word and S7 and S8 could use different individual control words.

The content CT of all these encrypted services may be broadcast simultaneously so that all the user units receive the encrypted services. This is illustrated on FIG. 5. As in this example services S1, S2 and S3 belong to the same package P1, the control words cw1, cw2 and cw3 may be equal.

A user unit is often able to receive simultaneously one or two services. Usually, a user unit can receive several services if they are broadcast on the same transponder. As an example, one service can be viewed on a TV screen or on another display and another service can be stored in a memory associated to the user unit. Some user units may receive more than two services. In this case, data corresponding to another service could be displayed in a "picture-in-picture" (PIP) mode.

According to the invention, entitlement control messages ECM are prepared in the management center MC. This is illustrated by FIG. 3 in connection with FIGS. 1 and 2. More specifically, an entitlement control message is prepared for each individual user unit. To prepare such a control message, it is first searched in the table of the management center, the packages corresponding to a specific user unit. For example the user unit STB1 corresponds to packages P1. The user unit STB4 corresponds to packages P1, P2 and P3. Depending on the packages subscribed, the control words for each package or service included in the subscription are retrieved.

If we assume that the different services of a same package share the same control word, the user unit STB1 has access to package P1 which corresponds to services S1, S2 and S3 i.e. to the control word cw1. For the user unit STB4, the packages P1, P2 and P3 enables access to services S1, S2, S3, S4 and S5. Thus, the control words cw1, cw4 and cw5 must be sent.

Once the correct control words are retrieved, they are encrypted with a key pertaining to the concerned user unit. This key is stored in the table of the management center and corresponds to K1 for user unit STB1, and K4 for user unit STB4 for example. The key is also known to the user unit. This key can be stored in a chipset of the user unit and can be hard coded so that it is not possible to modify this key fraudulently. The key can also be calculated from such a chipset key so that, on the one hand, the hard coded chipset key cannot be modified and on the other hand, different keys could be obtained by modifying the calculation of the key. The calculation of the key could be done by a concatenation, an encryption or any other combination of the chipset key and a number that can be random or not. The key could also be stored in a security module of the user unit. In this case, the key could be stored during a personalization phase in a secure environment or could be securely sent by the management centre during an initialization phase.

It is possible to use either a symmetric key or an asymmetric key. In case of a symmetric key, the management center and the user unit contain the same key. In case of an asymmetric key, one key of a key pair is stored in the management center and the other key of the pair is stored in the user unit. According to a specific embodiment, the security module of the user unit contains a private key. The management center contains the corresponding public key of a private-public key pair. This may also be reversed in order to prevent deriving the public key of a security module from its extracted private key. The management center and the user unit can exchange a session key that is used to encrypt and decrypt data. Such a session key is symmetric, which means that the same key is used to encrypt and decrypt, and it has limited validity duration.

At the expiration of the validity duration, a bidirectional communication between the management centre and the user unit is initiated to generate and exchange a new session key.

Several ways are available to encrypt the control words and to indicate the user unit where the correct control word can be found within the entitlement control message. Four of these different ways are illustrated on FIGS. 4a to 4d.

In all the examples, the control message contains the unique address UA of the concerned user unit. In the example of FIG. 4a, the control words are associated to a package identifier ID(P). Thus, the control message of FIG. 4a contains a first package identifier ID(P1) which means that the control word contained in the control message after this package identifier must be used to decrypt content corresponding to package P1, i.e. services S1, S2 or S3. The control word cw1 corresponding to this package P1 is encrypted by the key K4 pertaining to the user unit STB4. Thus, only this user unit will be able to use the control message and to obtain the control word cw1. The control message further comprises a second package identifier ID(P2) corresponding to package P2, i.e. to service S4 and to control word cw4. This control word is encrypted by the key K4 of the concerned user unit. The control message further contains the package identifier ID(P3) corresponding to service S5 and to control word cw5. This control word is also encrypted by the concerned key K4. It should be noted that instead of sending one control word per package, it is possible and preferred to send two control words, for example a control word corresponding to the decryption of a current portion of an event and a control word corresponding to the next portion of the event. Thus, the notation cw1 on the drawings can encompass the case where the control word is formed of an even control word cw1e and an odd control word cw1o According to a second embodiment illustrated by FIG. 4b, space is reserved for the control words of all the packages. However, if the user subscribed to a specific package, the correct control word is introduced in the message. If the user did not subscribe to a specific package, the correct control word is replaced by a specific value that can be interpreted by the user unit. This specific value could be 0 or F for example. In FIG. 4b we assume that the user unit STB4 subscribed to the packages P1, P2 and P3, but not to P4 and P5. Therefore, the corresponding entitlement control message contains the control word cw1 for package P1, the control word cw4 for package P2 and the control word cw5 for package P3. The control words corresponding to the packages P4 and P5 are replaced by 0. These control words are concatenated and are encrypted by the key K4 pertaining to the concerned user unit.

In the example of FIG. 4c, the entitlement control message contains a bitmap that indicates the packages that are available for a given user unit. In this example, the three first values of the bitmap are equal to 1, which means that the user unit subscribed to the packages P1, P2 and P3. The two last values of said bitmap are equal to 0, which means that the user unit did not subscribe to the two last packages, i.e. P4 and P5.

As shown in FIG. 4c, the control words are encrypted by a key Kn which is different to the key K4 pertaining to the user unit. This key Kn is sent in the control message, encrypted by the key K4 pertaining to the user unit. However, the knowledge of key K4 is necessary to decrypt Kn and to further decrypt the control words. Thus, the control words are secured by the key pertaining to the user unit.

FIG. 4d shows another embodiment that combines elements of the previous embodiments. According to this figure, a message contains the package identifiers ID(P1), ID(P2) ID(P3) that indicates that the concerned user unit is entitled to packages P1, P2 and P3. The control message contains the corresponding control words cw1, cw4 and cw5, these control words being concatenated and encrypted by the key K4 pertaining to the user unit.

As the control messages are specific to a user unit, these messages can be sent in clear or encrypted with a low level of security. Even if sent in clear, the messages will not be useful to a fraudulent user or to any user other than the user for which the message was prepared.

Further to the encrypted control words and the package identification data, the entitlement control message also contain data concerning the user unit the message is intended to. This data is typically the unique address UA of the user unit STB.

With reference to FIGS. 4 and 5, the user unit, for example user unit STB4 as in the example illustrated, receives the broadcast content CT=$[(S1)_{cw1}, (S2)_{cw2}, (S3)_{cw3}, \ldots]$. It also receives at least the entitlement control message that was prepared for this user unit. In case of point to point transmission of the entitlement control message, one user unit receives only the messages corresponding to said user unit. In such a case, a communication address for the user unit is stored in the management center, for example in the table illustrated by FIG. 2. The communication address can be an IP address and the control messages are then transmitted by using a network such as Internet.

According to another embodiment, the control messages may be sent to a modem of the user unit embedded in a short message commonly known as SMS (Short Message Service) in GSM mobile phone networks. The SMS may remain stored in a SMS server of the GSM mobile phone network if the mobile phone receiver modem is not ready or available for receiving messages.

Thus, it is apparent that the Entitlement control messages ECM are sent uniquely to the corresponding user unit, using a network that is distinct from the broadcast network. The messages are sent on a channel that is accessible whatever the selected service is. Accordingly, the invention uses no broadcast bandwidth for sending the control messages.

The system according to the invention improves security in that a specific ECM is sent to one receiver decoder only. It becomes more difficult to receive and listen to more than one ECM as was the case in prior art.

The mobile phone modem has been described as a GSM modem. It is of course possible to have any other type of modem depending on the mobile phone network's standard, e.g., GSM, GPRS, UMTS.

The control messages could also be broadcast. In this case, a filter F(UA) in the user unit filters out the messages that are not intended to the concerned user unit. This is done by using the unique address UA of the user unit.

When an entitlement control message, for example ECM4 is received by the user unit STB4 and passes through the filter F(UA), the key K4 is retrieved from the user unit, and applied to the part of the control message containing the control words. This enables retrieving the control words corresponding to the services the user unit is entitled to access to.

The current service, i.e. the service the user is currently watching is retrieved. This service is S3 in the represented example. The corresponding control word cw3 can then be extracted from the decrypted control message and used to decrypt the content of service S3.

In the example described, for simplification purpose, the control messages contain one control word per service. In practice however, the control messages may comprise, for each service, one control word corresponding to the current content and another control word that must be used to decrypt the next portion of the content. As it is well known, this enables the user unit to obtain the next control word while the current control word is still being used.

According to another embodiment, the control message could not contain the control word(s) corresponding to the content currently broadcast, but only control words that correspond to content that will be broadcast in a near future. This could be useful in particular in devices which remain switched on or which are rarely switched off.

According to another further embodiment, the number of control words could be greater than two. Any combination of the above embodiments is also possible.

According to a specific embodiment, the control words could be submitted to a "hierarchy". For example, the services S1, S2 and S3 could be a basic offer. Thus, the corresponding control words or control word would be sent to all the users having subscribed to the corresponding packages. The user having a package corresponding to a premium subscription, for example P1, P2 and P3 could receive only the control words corresponding to the packages that are added to the basic subscription, i.e. the control words cw4 and cw5. The control word cw1 could be formed from cw4 and/or cw5. As an example, cw1 could be a first part of cw4. This would spare bandwidth as the control words corresponding to the basic subscription would not be sent to the users having a premium subscription.

It should be noted that other embodiments could also be used. For example, one control word could be obtained by a hash of one or several other control words. Thus, it is not possible to calculate the original control words by knowing the result of the hash. Similarly, one control word could be obtained by a combination of one or several control word. This combination can encompass several mathematical functions such as a XOR, encryption, concatenation or similar operations.

When the entitlement management messages are broadcast, they are sent on a single channel that can be accessed by all the user units independently on the service they are currently tuned on. Thus, a single ECM stream is sufficient for all the users and it is not necessary to repeat this stream on different channels.

In the above description, the control messages contain control words intended to enable access to content. The same control messages could also be used for forming an electronic program guide for example.

In this case, the packages a user unit is authorized to decrypt are displayed on this user unit by using for example the package identifier contained in the messages as described in FIG. 4a.

Thank to the method of the invention, the decryption of a content when the viewed channel is changed (zapping) is immediate as the user receives all the control words for the authorized channels at the same time.

The invention claimed is:

1. Method for providing access to a plurality of broadcast services, the method comprising:

providing said access via at least one first channel to a plurality of user units, said at least one first channel being a broadcast channel, at least one user unit from said plurality of user units being configured to tune to one of the plurality of broadcast services at any given time, said plurality of services forming a subset of all services broadcast by a management center, said all services being simultaneously accessible to a plurality of user units, said subset of services defining a package, said at least one user unit registered in a register of the management center such that said user unit is authorized to access said package, each service comprising audio/video data, the audio/video data of a service being encrypted by at least one control word;

determining, from the register, the package to which said at least one user unit is entitled access and a unique key pertaining to said at least one user unit;

forming a message comprising at least one control word for each service of the package to which the at least one user unit is entitled access, said control word being secured by the unique key pertaining to said at least one user unit; and transmitting to said at least one user unit said message on a second channel, said second channel being accessible by the user unit irrespective of which service from the plurality of services the user unit is tuned to, wherein said message provides indication for identifying the control words corresponding to at least one service, and the indication includes at least one of a service identification data (ID-P) and a bitmap.

2. Method for accessing services according to claim 1, wherein the step of transmitting said message comprises broadcasting said message.

3. Method for accessing services according to claim 1, wherein the step of transmitting said message comprises sending said message by a point-to-point connection with said at least one user unit.

4. Method for accessing services according to claim 1, wherein said message containing at least one control word further contains data concerning said at least one user unit.

5. Method for accessing services according to claim 4, wherein said data concerning said at least one user unit comprises a unique identifier of said at least one user unit.

6. Method for accessing services according to claim 1, wherein one control word is valid for accessing to at least two different services.

7. Method for accessing services according to claim 1, wherein one control word is valid for accessing to all the services forming one package.

8. Method for accessing services according to claim 1, wherein the message comprises a plurality of control words, the control words being different for each service.

9. Method for accessing services according to claim 1, wherein the message comprises a plurality of control words, and the plurality of control words are secured by,
combining the control words corresponding to the services the at least one user unit is entitled to access to obtain a combined control word, and
encrypting the combined control word with said unique key pertaining to said at least one user unit.

10. Method for accessing services according to claim 1, wherein the steps of securing the control words comprises a step of encrypting each individual control word with a key depending on said unique key pertaining to said at least one user unit.

11. Method for accessing services according to claim 1, wherein the control words are encrypted by a key depending on the unique key pertaining to said user unit and wherein said message contains the key depending on the unique key pertaining to said user unit, encrypted by the unique key pertaining to said at least one user unit.

12. Method for accessing services according to claim 11, wherein said unique key depending on the unique key pertaining to said user unit is equal to the key pertaining to said at least one user unit.

13. Method for accessing services according to claim 1, wherein the subset of services are unique to the package.

* * * * *